United States Patent
Noda et al.

(10) Patent No.: US 7,626,773 B2
(45) Date of Patent: Dec. 1, 2009

(54) LENS UNIT

(75) Inventors: Toshinari Noda, Osaka (JP); Naoki Tatehata, Kyoto (JP); Yoshihiko Tsujikawa, Osaka (JP); Satoshi Ueda, Kyoto (JP); Katsuya Morinaka, Osaka (JP)

(73) Assignee: Panasonic Corporation, Osaka (JP)

( * ) Notice: Subject to any disclaimer, the term of this patent is extended or adjusted under 35 U.S.C. 154(b) by 140 days.

(21) Appl. No.: 11/663,355

(22) PCT Filed: Nov. 4, 2005

(86) PCT No.: PCT/JP2005/020272
§ 371 (c)(1),
(2), (4) Date: Mar. 21, 2007

(87) PCT Pub. No.: WO2006/049238
PCT Pub. Date: May 11, 2006

(65) Prior Publication Data
US 2008/0100932 A1    May 1, 2008

(30) Foreign Application Priority Data
Nov. 8, 2004  (JP) .............................. 2004-323361
Oct. 11, 2005  (JP) .............................. 2005-296279

(51) Int. Cl.
G02B 7/02   (2006.01)
(52) U.S. Cl. .................. 359/819; 359/704; 359/811
(58) Field of Classification Search ............... 359/704, 359/811, 819
See application file for complete search history.

(56) References Cited

U.S. PATENT DOCUMENTS

| 1,932,817 | A | * | 10/1933 | Gehrke ....................... 352/244 |
| 4,586,787 | A | * | 5/1986 | Fiandra et al. .............. 359/830 |
| 5,493,452 | A | * | 2/1996 | Hoshino et al. ............. 359/819 |
| 6,594,204 | B1 | * | 7/2003 | Yamamoto et al. ....... 369/44.14 |

FOREIGN PATENT DOCUMENTS

| CN | 1271864 | 11/2000 |
| CN | 1442718 | 9/2003 |
| JP | 4-166904 | 6/1992 |
| JP | 4-355419 | 12/1992 |

(Continued)

OTHER PUBLICATIONS

Patent Abstracts of Japan—English Abstract of JP 2003-289457, Oct. 2003.

*Primary Examiner*—Joseph Martinez
(74) *Attorney, Agent, or Firm*—Wenderoth, Lind & Ponack, L.L.P.

(57) ABSTRACT

A lens unit includes a lens barrel (7) with a through hole (6), a first lens (8a) press-fitted into the through-hole (6), a first step (9a) catching an outer edge of the first lens (8a) in the through-hole (6), a second lens (8b) press-fitted into the through-hole (6) in a direction of an optical axis of the first lens (8a), and a second step (9b) catching an outer edge of the second lens (8b) in the through-hole (6). The second lens (8b) has a diameter larger than that of the first lens (8a). A third step (10a) or a sloped portion broadening the through hole from the first lens to the second lens is further provided.

8 Claims, 4 Drawing Sheets

| FOREIGN PATENT DOCUMENTS | | |
|---|---|---|
| JP | 5-011157 | 1/1993 |
| JP | 8-234070 | 9/1996 |
| JP | 2000-347088 | 12/2000 |
| JP | 2004-125966 | 4/2004 |
| JP | 2004-147032 | 5/2004 |
| KR | 1994-0008681 | 9/1994 |
| KR | 2000-0071509 | 11/2000 |

* cited by examiner

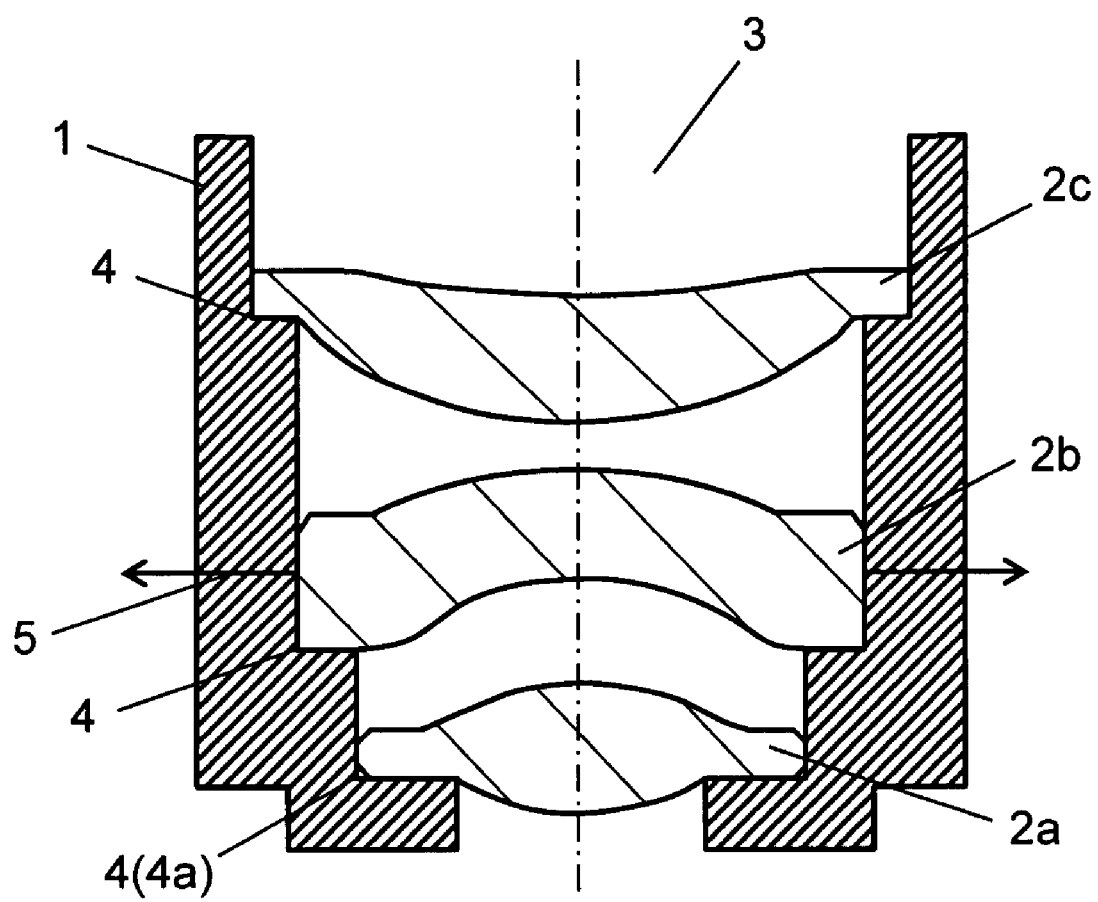
FIG. 6 – PRIOR ART

LENS UNIT

This application is a U.S. national phase application of PCT International Application PCT/JP2005/020272, filed Nov. 4, 2005.

TECHNICAL FIELD

The present invention relates to lens units with multiple lenses press-fitted and anchored in position in a lens barrel.

BACKGROUND ART

Lens units featured in addition to a primary phoning function in recent camera-mounted mobile phones or the like have a structure in which lenses 2a, 2b, and 2c are integrated with lens barrel 1 to be attached to the main body of the device as shown in FIG. 6.

In FIG. 6, through-hole 3 is created in lens barrel 1. Lenses 2a, 2b, and 2c are press-fitted in this sequence into through-hole 3. Lenses 2a, 2b, and 2c are caught at each step 4 provided inside through-hole 3 to set the distance between lens.

In a conventional lens unit as described above, the number of steps is determined in accordance with the number of lenses configuring the lens unit. The diameter of through-hole 3 between adjacent steps 4 is uniform.

A related prior art is, for example, disclosed in Japanese Patent Unexamined Publication No. 2004-147032.

In FIG. 6, when the diameter of through-hole 3 between steps 4 is uniform, enlargement stress 5, generated while the second lens (e.g., lens 2b) is press-fitted, acts to further broaden through-hole 3 in addition to the stress generated by the lens (e.g., lens 2a) press-fitted first. As a result, this stress 5 concentrates on step 4a holding lens 2a press-fitted first, and may damage lens barrel 1. Accordingly, this operation needs to be conducted in an extremely cautious manner in the manufacturing steps of the conventional lens unit.

SUMMARY OF THE INVENTION

A lens unit of the present invention includes a lens barrel with a through-hole, a first lens press-fitted into the through-hole, a first step catching an outer edge of the first lens in the through-hole, a second lens press-fitted into the through-hole in a direction of an optical axis of the first lens, and a second step catching an outer edge of the second lens in the through-hole. The second lens has a diameter larger than that of the first lens. A third step or a sloped area broadening the through-hole from the first lens to the second lens is further provided between the first step and the second step.

This structure suppresses the concentration of an enlargement stress, generated by the lens press-fitted afterward, on the step catching the lens press-fitted first. Damage to the lens unit is thus preventable. Accordingly, the productivity of the lens unit can be improved.

BRIEF DESCRIPTION OF DRAWINGS

FIG. 6 is a sectional view of a conventional lens unit.

DETAILED DESCRIPTION OF PREFERRED EMBODIMENTS

Exemplary embodiments of the present invention are described below with reference to the drawings.

First Exemplary Embodiment

Figure 1:
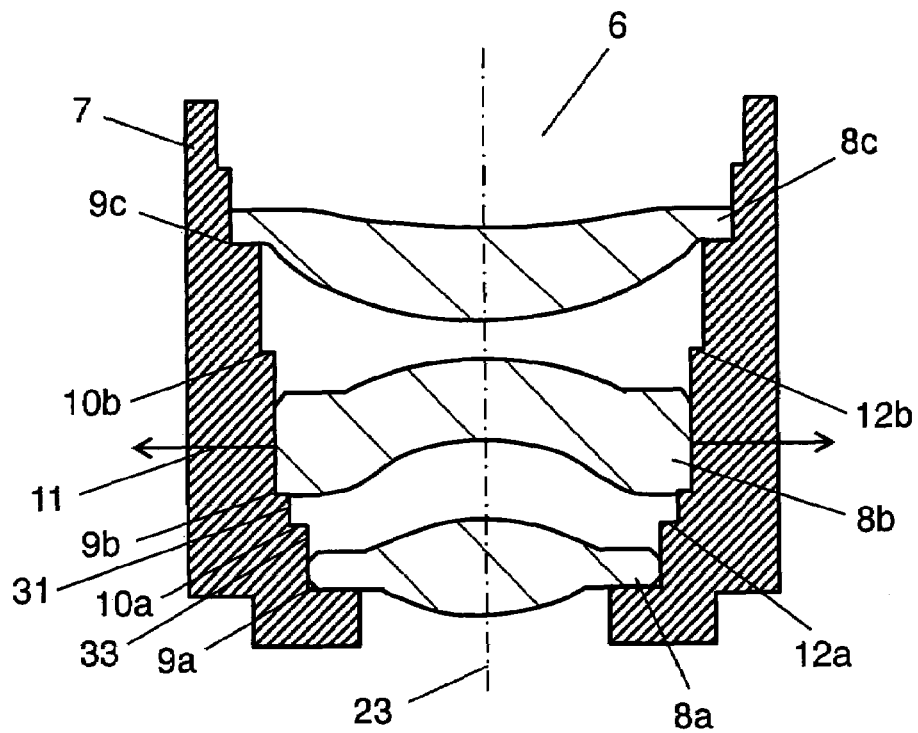
FIG. 1 is a sectional view of a lens unit in a first exemplary embodiment of the present invention.

FIG. 1 is a sectional view of a lens unit in the first exemplary embodiment of the present invention. The lens unit in the first exemplary embodiment includes lens barrel 7 with through-hole 6, first lens 8a press-fitted into through-hole 6, first step 9a catching an outer edge of first lens 8a in through-hole 6, second lens 8b press-fitted into through-hole 6 in a direction of an optical axis of first lens 8a, and second step 9b catching an outer edge of second lens 8b in through-hole 6. Second lens 8b has a diameter larger than that of first lens 8a. In this structure, third step 10a is further provided between first step 9a and second step 9b. This lens unit is mainly employed in a small solid-state image pickup system, typically for camera-mounted mobile phones.

The structure of the lens unit in the first exemplary embodiment of the present invention is detailed next. In FIG. 1, the lens unit in the first exemplary embodiment includes resin lens barrel 7 with through-hole 6, and three lenses: first lens 8a, second lens 8b, and third lens 8c, press-fitted and anchored in position in through-hole 6. First step 9a, second step 9b, and third step 10a, and also fourth step 9c and fifth step 10b are formed on an inner wall of through-hole 6.

The outer edge of first lens 8a is anchored inside through-hole 6 by contacting first step 9a. The outer edge of second lens 8b is anchored inside through-hole 6 by contacting second step 9b. The outer edge of third lens 8c is anchored inside through-hole 6 by contacting fourth step 9c. In this way, an insertion distance of each of lenses 8a, 8b, and 8c is set in through-hole 6.

In this lens unit, the lenses are press-fitted into through-hole 6 in the order of smaller diameter with respect to lens barrel 7, i.e., lens 8a, lens 8b, and then lens 8c. The distance between adjacent lenses is set by making the outer edge of each lens 8a, 8b, and 8c caught at steps 9a, 9b, and 9c corresponding to the diameters of lenses 8a, 8b, and 8c, respectively.

Step 10a is further formed between step 9a and step 9b in this lens unit. Step 10b is further formed between step 9b and step 9c. Provision of these steps 10a and 10b suppresses the concentration of enlargement stress 11, generated by the lens press-fitted afterward (e.g., lens 8b), on step 9a catching lens 8a which is press-fitted first. Damage to lens barrel 7 due to this enlargement stress 11 is thus suppressed, allowing the productivity of the lens unit to be improved.

Damage can be suppressed because provision of third step 10a between lenses 8a and 8b, for example, changes a thickness of lens barrel 7 in front and back of step 10a, and thus the strength of lens barrel 7 also changes. In other words, if lens 8b is press-fitted under conditions where lens 8a is already press-fitted, a press-fitting stress of this lens 8b applies a force that acts to enlarge lens barrel 7, using a base of step 9a holding lens 8a press-fitted first as a fulcrum. Provision of step 10a between this preceding lens 8a and subsequent lens 8b can intentionally change the strength of lens barrel 7 at this stepped portion.

In this structure, enlargement stress 11 accompanying the press-fitting of subsequent lens 8b first acts to enlarge lens barrel portion 31 that is between lens 8b and step 10a. In line with this enlargement, enlargement stress 11 further acts to enlarge lens barrel portion 33 that is between lens 8a and step 10a. More specifically, in the conventional structure shown in FIG. 6, entire enlargement stress 5 generated by press-fitting the subsequent lens 2b is concentrated on step 4a catching preceding lens 2a. Contrarily, in this exemplary embodiment, provision of another third step 10a between first step 9a catching first lens 8a and second step 9b catching second lens 8b allows dispersion of enlargement stress 11 generated by press-fitting subsequent lens 8b. Accordingly, damage to lens barrel 7 due to enlargement stress 11 caused by press-fitting the lens can be suppressed.

In addition, reduction of the effect of enlargement stress 11 applied to step 9a catching preceding lens 8a also enables the suppression of deviation of optical axis 23 of preceding lens 8a due to this enlargement stress 11. Accordingly, variations in optical characteristics due to assembly of the lens unit can be suppressed.

Ridge 12a in through-hole 6 formed by providing third step 10a may be curved. Ridge 12b in through-hole 6 formed by providing fifth step 10b may also be curved.

The lens unit of the present invention establishes a light path with respect to a light beam entering lenses 8a, 8b, and 8c disposed inside through-hole 6. Provision of steps 10a and 10b in the light path tends to cause flare due to diffused reflection at these steps. As a countermeasure, ridges 12a and 12b of steps 10a and 10b protruding in through-hole 6, which are a major cause of diffused reflection, may be curved. This effectively suppresses diffused reflection, and also suppresses deterioration of optical characteristics of the lens unit.

Second Exemplary Embodiment

Figure 2:
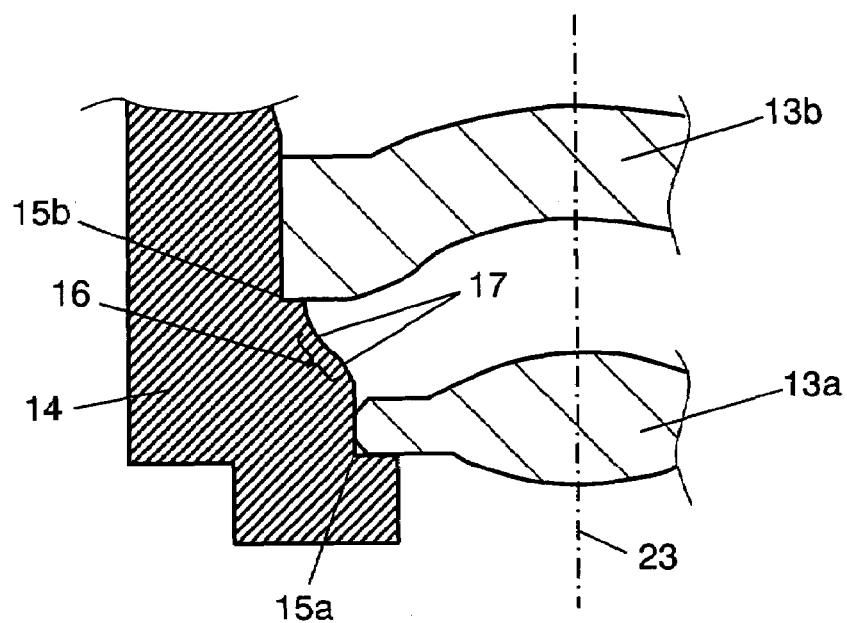
FIG. 2 is a sectional view of a lens unit in a second exemplary embodiment of the present invention.

FIG. 2 is a sectional view of a lens unit in the second exemplary embodiment of the present invention. The lens unit in this exemplary embodiment includes lens barrel 14 with a through-hole, first lens 13a press-fitted into the through-hole, first step 15a catching an outer edge of first lens 13a in the through-hole, second lens 13b press-fitted into the through-hole in a direction of optical axis 23 of first lens 13a, and second step 15b catching an outer edge of second lens 13b in the through-hole. Second lens 13b has a diameter larger than that of first lens 13a. In this structure, sloped area 16 which broadens the through-hole from first lens 13a to second lens 13b is provided.

Also, the upper and lower ends of sloped area 16 may conform to ends of first step 15a and second step 15b. Furthermore, at least upper or lower ends of sloped area 16 may be curved.

The structure of the lens unit in the second exemplary embodiment of the present invention is detailed next. In FIG. 2, sloped area 16 between first step 15a catching first lens 13a and second step 15b catching second lens 13b is slanted so that a thickness of lens barrel 14 between first lens 13a and second lens 13b successively changes. This enables successive dispersion of the enlargement stress at this sloped area 16. Consequently, the same effect as third step 10a or fifth step 10b in the first exemplary embodiment is achievable.

The same effect is also achievable when the upper and lower ends of this sloped area 16 conform to ends of steps 15a and 15b. In addition, diffused reflection in a light path can be effectively suppressed by applying an aforementioned curved structure also to ridge 17 formed at the upper end or lower end of this sloped area 16, and thus deterioration of optical characteristics of the lens unit can be suppressed.

Third Exemplary Embodiment

Figure 3:
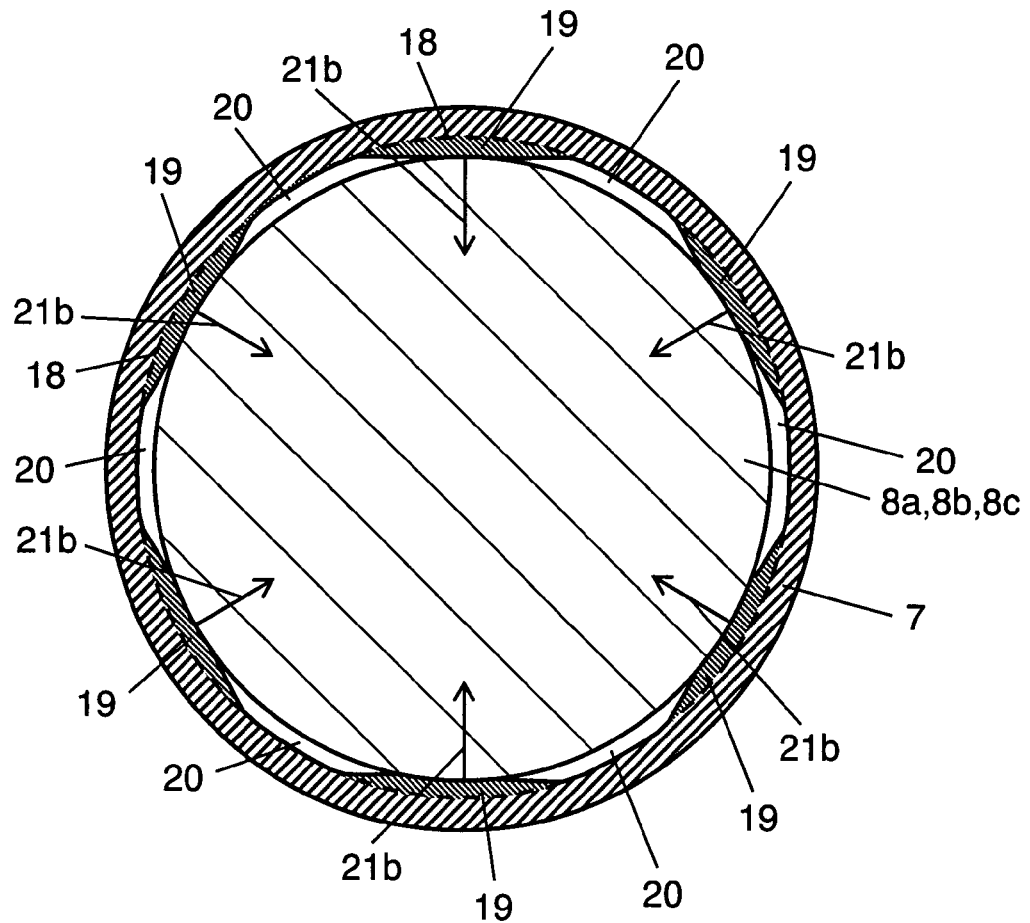
FIG. 3 is a horizontal sectional view of a lens unit in a third exemplary embodiment of the present invention.
Figure 4:
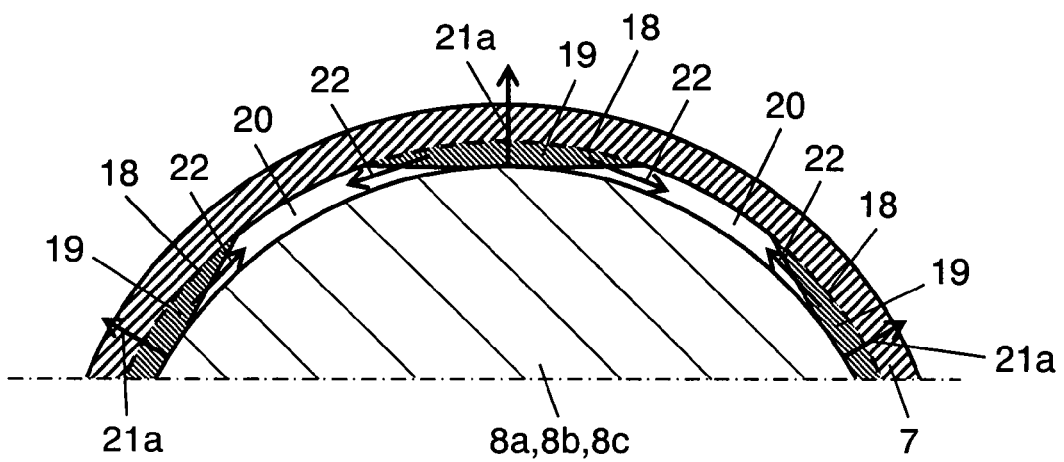
FIG. 4 is a detailed view of a protrusion of the lens unit shown in FIG. 3.
Figure 5:
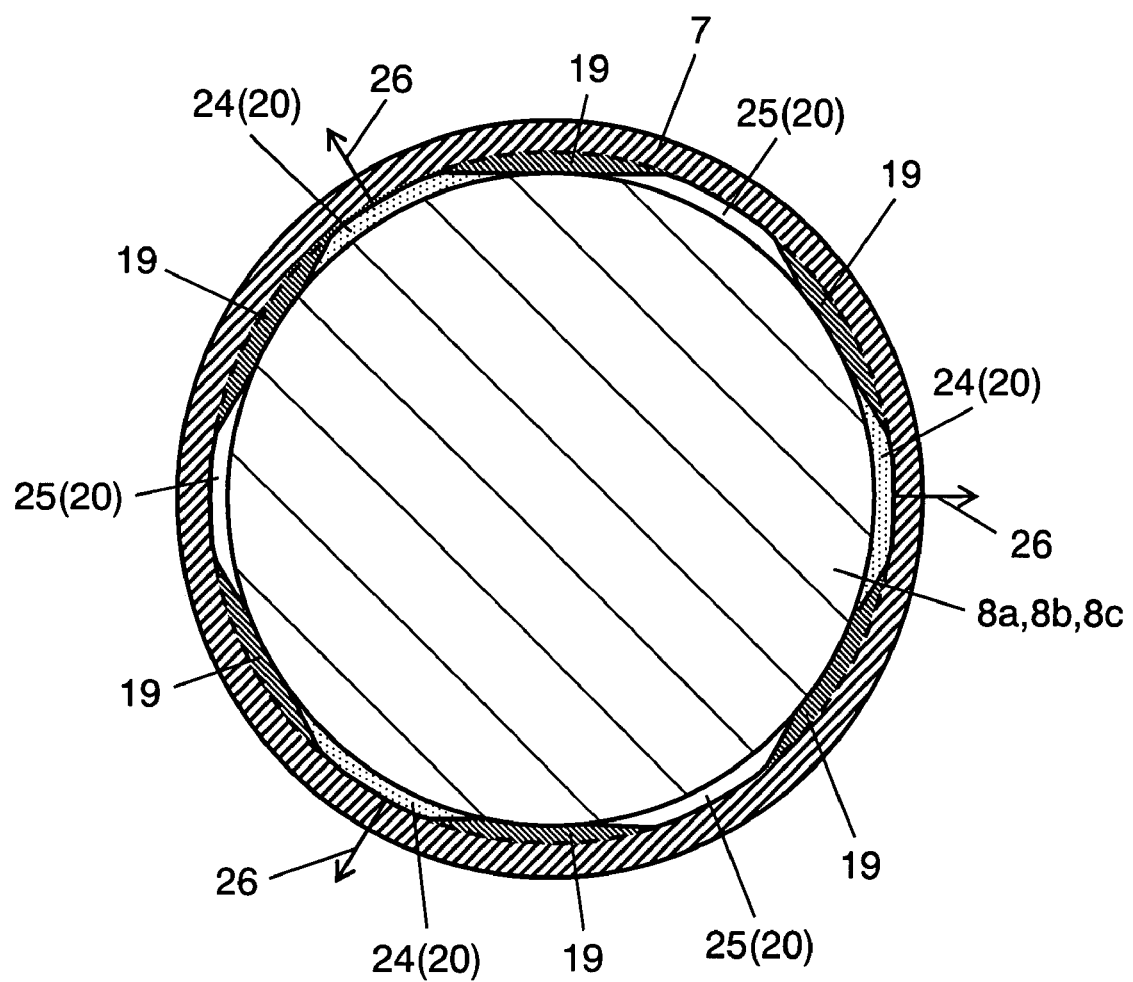
FIG. 5 is a horizontal sectional view of a structure in which adhesive is applied to the protrusion of the lens unit shown in FIG. 3.

FIG. 3 is a horizontal sectional view of a lens unit in the third exemplary embodiment of the present invention. FIG. 4 is a detailed view of a protrusion in the lens unit shown in FIG. 3. FIG. 5 is a horizontal sectional view of a structure in which adhesive is applied to the protrusion in the lens unit shown in FIG. 3.

In the aforementioned first exemplary embodiment, although not particularly illustrated, lenses 8a, 8b, and 8c are press-fitted into lens barrel 7 in a structure such that an internal-wall shape of through-hole 6 substantially conforms to the outer-periphery shape of lenses 8a, 8b, and 8c, and thus the entire side faces of the outer periphery of the lenses tightly contact the inner wall of the through-hole when the lenses are press-fitted.

On the other hand, in the third exemplary embodiment, multiple protrusions 19 protruding inward are provided along area 18 where the outer-periphery face of lenses 8a, 8b, and 8c tightly contact the inner wall of the through-hole. Lenses 8a, 8b, and 8c tightly contact the inner wall of through-hole 6 via these protrusions 19. Also in this exemplary embodiment, the same effect and advantage as the first exemplary embodiment and the second exemplary embodiment are achievable by providing steps 10a and 10b in through-hole 6.

When lenses 8a, 8b, and 8c are press-fitted into through-hole 6 via protrusions 19, as shown in FIG. 3, a space is created between adjacent protrusions 19. The presence of this space 20 suppresses the generation of birefringence in lenses 8a, 8b, and 8c due to the stress generated while press-fitting lenses 8a, 8b, and 8c into the through-hole of lens barrel 7.

As shown in FIG. 4, protrusions 19 elastically deform toward inside of each space 20 as a result of contact stress 21a applied to lens barrel 7 while press-fitting lenses 8a, 8b, and 8c. Stress 22 involved with this elastic deformation is distributed from contact stress 21a generated by press-fitting lenses 8a, 8b, and 8c. Therefore, contact stress 21b (FIG. 3) applied from lens barrel 7 to lenses 8a, 8b, and 8c is contact stress 21a applied to lens barrel 7 minus stress 22 associated with elastic deformation. As a result, birefringence generated in lenses 8a, 8b, and 8c is reduced. Deterioration of optical characteristics in assembly of the lens unit can thus be suppressed, allowing the productivity of the lens unit to be improved.

In addition, in this lens unit, six protrusions 19 and six spaces 20 formed by these protrusions 19 are provided at equal intervals in an axisymmetrical arrangement with respect to optical axis 23 of lenses 8a, 8b, and 8c. Directions of contact stress 21b generated at contact portions of each protrusion 19 and lenses 8a, 8b and 8c are thus dispersed in directions equally dividing lenses 8a, 8b, and 8c. The vectorial sum therefore theoretically becomes zero. Accordingly, deviation in the optical axis of lenses 8a, 8b, and 8c caused by the contact stress exerted by each contact portion onto lenses 8a, 8b, and 8c is preventable. The productivity of the lens unit can thus be further improved.

In the lens unit in which lenses 8a, 8b, and 8c are press-fitted into lens barrel 7 for integration, each lens 8a, 8b, and 8c and lens barrel 7 may be anchored in position by adhesive so as to further improve the integrity of each lens 8a, 8b, and 8c and lens barrel 7. In this case, the use of space 20 for adhesion, as shown in FIG. 5, can prevent creeping of adhesive applied to adhesion area 24 over the surface of each lens 8a, 8b, and 8c. Accordingly, an effect of optical characteristics due to creeping of this adhesive over the optical face of each lens 8a, 8b, and 8c can be suppressed, allowing the productivity of the lens unit to be improved.

In addition, in this lens unit, it is preferable that air passes through easily in front and back of lenses 8a, 8b, and 8c in lens barrel 7, taking into consideration the risk of condensation on lenses 8a, 8b, and 8c. To ensure proper air flow, at least one space 20 in multiple spaces 20 is preferably made non-adhesion area 25. When providing this non-adhesion area 25, stress dispersion is also considered in the same way as previously described using FIG. 1. From this viewpoint, adhesion area 24 and non-adhesion area 25 in spaces 20 are provided alternately so that any contraction stress 26 accompanying curing and contraction of adhesive can be dispersed in the same way as the aforementioned dispersion of contact stress 21b (FIG. 3) applied from protrusions 19.

Since lenses 8a, 8b, and 8c are press-fitted to protrusions 19, adhesion area 24 and non-adhesion area 25 are completely separated by the presence of protrusion 19 between these areas. Accordingly the adhesive in adhesion area 24 does not creep over non-adhesion area 25.

Still more, this lens unit has a structure in which six protrusions 19 are provided in lens barrel 7 for contacting lenses 8a, 8b, and 8c. To securely hold lenses 8a, 8b, and 8c with respect to lens barrel 7, it is preferable to provide three or more protrusions 19. Taking into account the alternate arrangement of adhesion areas 24 and non-adhesion areas 25 in spaces 20, however, it is preferable to provide four or more protrusions 19. In addition, with consideration to at least three-point support by adhesion areas 24, it is preferable to provide six or more protrusions 19.

Furthermore, if the shape of through-hole 6 in this lens barrel 7 is designed to be polygonal, a mold shape of lens barrel 7, particularly the mold shape for the side of through-hole 6, can be made by linearly cutting a side face of a cylindrical mold. This achieves good processability and ensures high molding accuracy. The productivity of the lens unit can thus be improved.

INDUSTRIAL APPLICABILITY

The lens unit of the present invention has improved productivity, and can thus be effectively applied to image pickup devices in a range of electronic apparatuses including compact high-performance digital cameras and mobile cameras.

The invention claimed is:

1. A lens unit comprising:
a lens barrel with a through-hole;
a first lens press-fitted into the through-hole;
a first step catching an outer edge of the first lens in the through-hole;
a second lens press-fitted into the through-hole in a direction of an optical axis of the first lens, the second lens having a diameter larger than that of the first lens; and
a second step catching an outer edge of the second lens in the through-hole;
wherein each of the first lens and the second lens contacts a portion of an inner wall of the lens barrel in the through-hole, said portion being substantially in parallel with the optical axis, while applying contacting stress to the inner wall so as to be held by the portion of the inner wall of the lens barrel;
wherein a sloped area of the inner wall of the lens barrel in the through-hole from the first lens to the second lens is further provided between the first step and the second step, the sloped area having an upper end and a lower end,
wherein the upper end of the sloped area conforms to an end of the second step and the lower end of the sloped area conforms to an end of the first step, and
wherein a diameter of the inner wall in the sloped area continuously changes between the first step and the second step and at least one of the upper end and the lower end of the sloped area is curved.

2. The lens unit of claim 1, wherein a plurality of protrusions protruding inward toward a center of the through-hole are provided on an inner wall of the through hole where at least one of the first lens and the second lens contacts; the plurality of protrusions are portions of the lens barrel protruded from the inner wall of the lens barrel in the through-hole, an outer-periphery face of the lens contacts the plurality of protrusions, and a space is created between adjacent protrusions of the plurality of protrusions.

3. The lens unit of claim 2, wherein adhesive is applied to a part of the spaces.

4. The lens unit of claim 1, further comprising:
a third lens press-fitted into the through-hole in a direction of an optical axis of the first lens and second lens, the third lens having a diameter larger than that of the second lens;
a fourth step catching an outer edge of the third lens in the through-hole; and
a fifth step provided between the second step and the fourth step.

5. A lens unit comprising:
a lens barrel with a through-hole;
a first lens press-fitted into the through-hole;
a first step catching an outer edge of the first lens in the through-hole;
a second lens press-fitted into the through-hole in a direction of an optical axis of the first lens, the second lens having a diameter larger than that of the first lens; and
a second step catching an outer edge of the second lens in the through-hole;
wherein each of the first lens and the second lens contacts a portion of an inner wall of the lens barrel in the through-hole, said portion being substantially in parallel with the optical axis, while applying contacting stress to the inner wall so as to be held by the portion of the inner wall of the lens barrel;
wherein a third step is further provided between the first step and the second step, a ridge is formed in the through-hole by the third step, and the ridge curved, and
wherein the third step does not catch a lens and does not contribute to catching a lens.

6. The lens unit of claim 5, wherein a plurality of protrusions protruding inward a center of the through-hole are provided on the inner wall of the through hole where at least one of the first lens and the second lens contacts, the plurality of protrusions are portions of the lens barrel protruded from the inner wall of the through-hole of the lens barrel, an outer-periphery face of the lens contacts the plurality of protrusions, and a space is created between adjacent protrusions.

7. The lens unit of claim 6, wherein adhesive is applied to a part of the spaces.

8. The lens unit of claim 5, further comprising:
a third lens press-fitted into the through-hole in a direction of an optical axis of the first lens and second lens, the third lens having a diameter larger than that of the second lens;
a fourth step catching an outer edge of the third lens in the through-hole; and
a fifth step provided between the second step and the fourth step.

* * * * *